United States Patent
Bovet

(10) Patent No.: US 9,538,377 B2
(45) Date of Patent: Jan. 3, 2017

(54) SWITCHING BETWEEN RESTRICTED-ACCESS WEBSITES ON MOBILE USER DEVICES

(71) Applicant: salesforce.com, inc., San Francisco, CA (US)

(72) Inventor: Jean Elie Bovet, Los Angeles, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/664,395

(22) Filed: Mar. 20, 2015

(65) Prior Publication Data

US 2016/0057621 A1 Feb. 25, 2016

Related U.S. Application Data

(60) Provisional application No. 62/040,841, filed on Aug. 22, 2014.

(51) Int. Cl.

| H04M 1/66 | (2006.01) |
|---|---|
| H04W 12/06 | (2009.01) |
| H04W 4/00 | (2009.01) |
| H04M 1/725 | (2006.01) |
| H04W 12/08 | (2009.01) |
| H04L 29/08 | (2006.01) |
| H04W 12/04 | (2009.01) |

(52) U.S. Cl.
CPC ............ H04W 12/06 (2013.01); H04L 67/145 (2013.01); H04M 1/72561 (2013.01); H04M 1/72577 (2013.01); H04W 4/003 (2013.01); H04W 12/08 (2013.01); H04W 12/04 (2013.01)

(58) Field of Classification Search
CPC ...... H04W 12/06; H04W 12/08; H04W 12/12; H04W 88/02
USPC ......................................................... 455/411
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Don N Vo
(74) *Attorney, Agent, or Firm* — Schwabe Williamson & Wyatt

(57) ABSTRACT

A system stores first information, provided by a first user input via a mobile operating system, which enables access to a first restricted access website. The system stores a first screenshot and first data associated with the first restricted access website in response to a first user request, via the mobile operating system, to switch to a second restricted access website. The system stores second information, provided by a second user input via the mobile operating system, which enables access to the second restricted access website. The system stores a second screenshot and second data associated with the second restricted access website in response to a second user input, via the mobile operating system, to switch to the first restricted access website. The system outputs the first screenshot supported by the first data. The system enables access to the first restricted access website based on the stored first information.

17 Claims, 3 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,508,946 B2 * | 3/2009 | Yamagata ............ G06F 12/1433 380/270 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,898,459 B2 * | 11/2014 | Chawla ................... H04L 9/321 713/156 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0212575 A1* | 8/2013 | Ito ..................... G06F 12/1475 718/1 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0283142 A1* | 9/2014 | Shepherd ............. G06F 3/0482 726/30 |
| 2014/0359537 A1 | 12/2014 | Jackobson et al. |

\* cited by examiner

SWITCHING BETWEEN RESTRICTED-ACCESS WEBSITES ON MOBILE USER DEVICES

RELATED APPLICATION

This is a non-provisional of U.S. Provisional Patent Application No. 62/040,841, filed Aug. 22, 2014, which is incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology disclosed herein relates to mobile operating systems and to enabling mobile operating system users to switch between websites having restricted access.

BACKGROUND

A mobile operating system, also referred to as a mobile OS, is an operating system that operates a portable or mobile device such as a smartphone, tablet, personal digital assistant (PDA), etc. Modern mobile operating systems combine some features of a personal computer operating system with other features, including one or more of a touchscreen, cellular communication, Bluetooth communication, Wi-Fi communication, near-field communication, infrared blaster, GPS mobile navigation, still or video camera, speech recognition, voice recorder, music player, etc.

Mobile devices that use a mobile operating system commonly have a small form factor, limited interactive capability, limited display size, limited memory or storage capacity, limited processing power, or a short battery life. These limitations on a mobile device impose limitations on the capabilities of a mobile operating system. For example, a personal computer operating system running on a laptop computer can enable multiple simultaneous sessions that are open to restricted-access websites. As a result, a user can quickly switch from a session at one restricted-access website to another by simply selecting a browser tab that corresponds to the other session.

Mobile operating systems lack this capability. A mobile operating system running on a smartphone can have open only one session at a restricted-access website at a time. To switch from one restricted-access website session to another, a smartphone user must end the current restricted-access website session and commence the other by entering access-enabling information to begin the session with the new restricted-access website. In this example, if the smartphone user wanted to switch back to a session with the previous restricted-access website, the mobile operating system would require that the smartphone user end the session with the new restricted-access website and then re-enter access-enabling information to create a new session with the previous restricted-access website. All of the data from the previous session with the first restricted access website would have been lost.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for detecting flooding of message queues.

Example System Overview

Figure 1A:
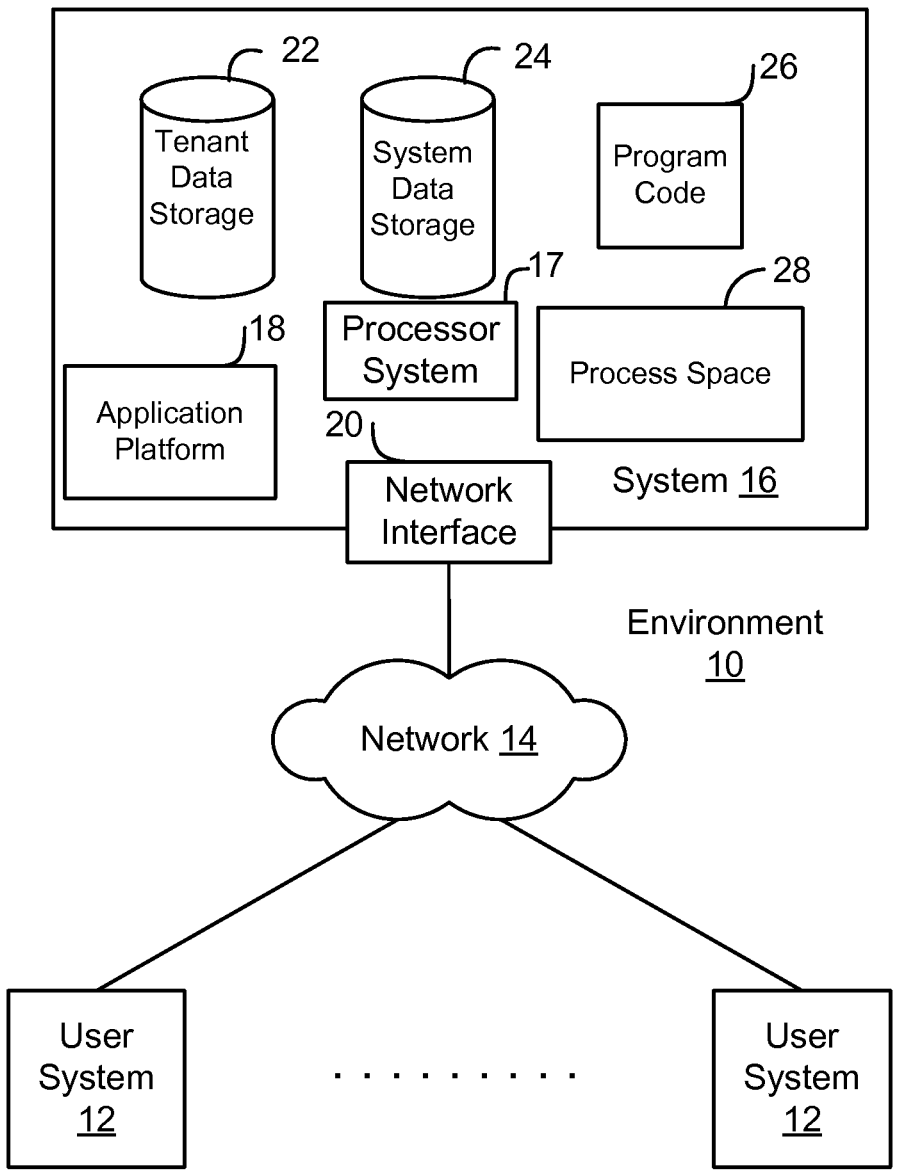
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications. Applications may be developed by the provider of the on-demand database service, by users accessing the on-demand database service via user systems 12, or by third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 may be configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a wearable device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
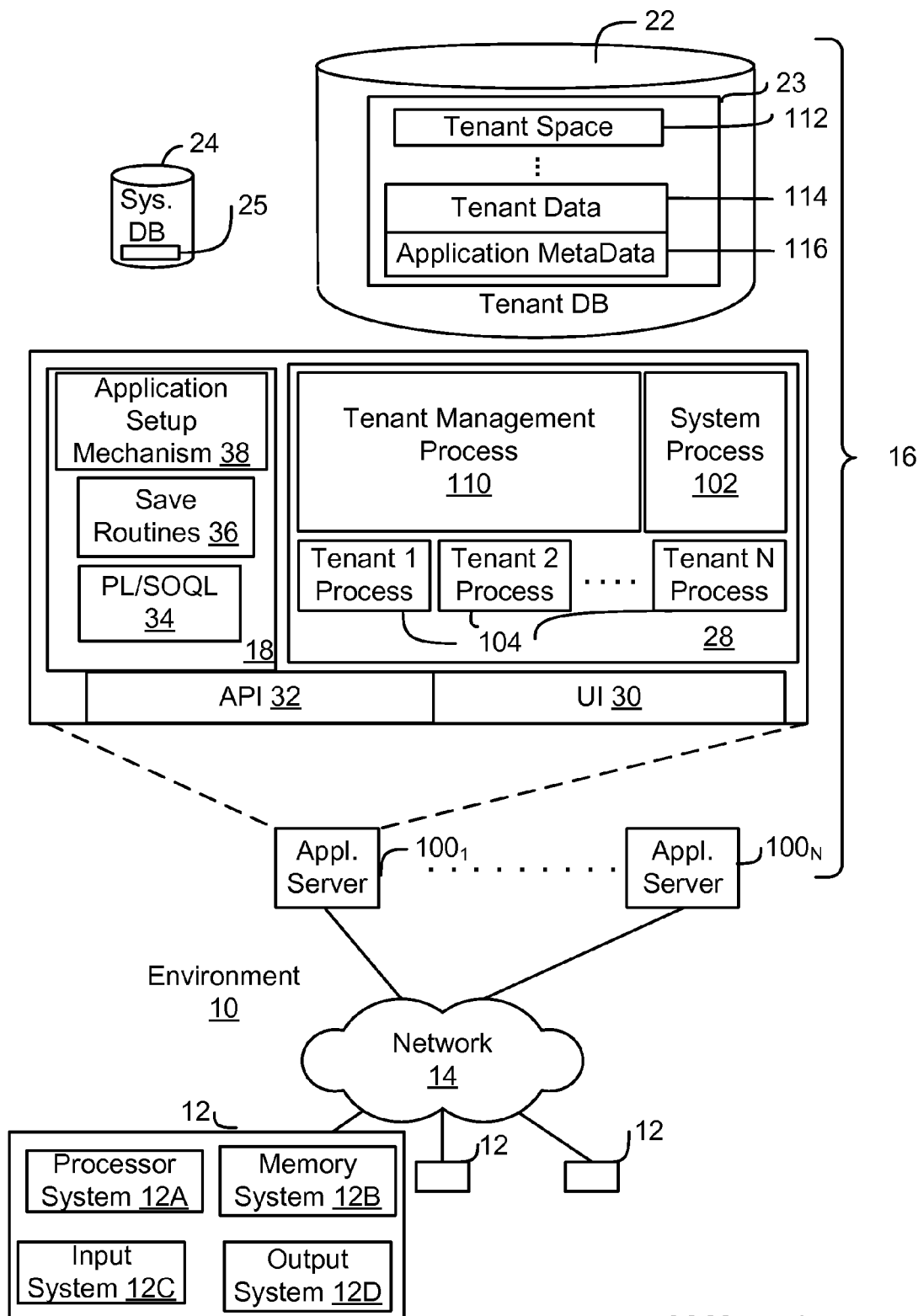
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
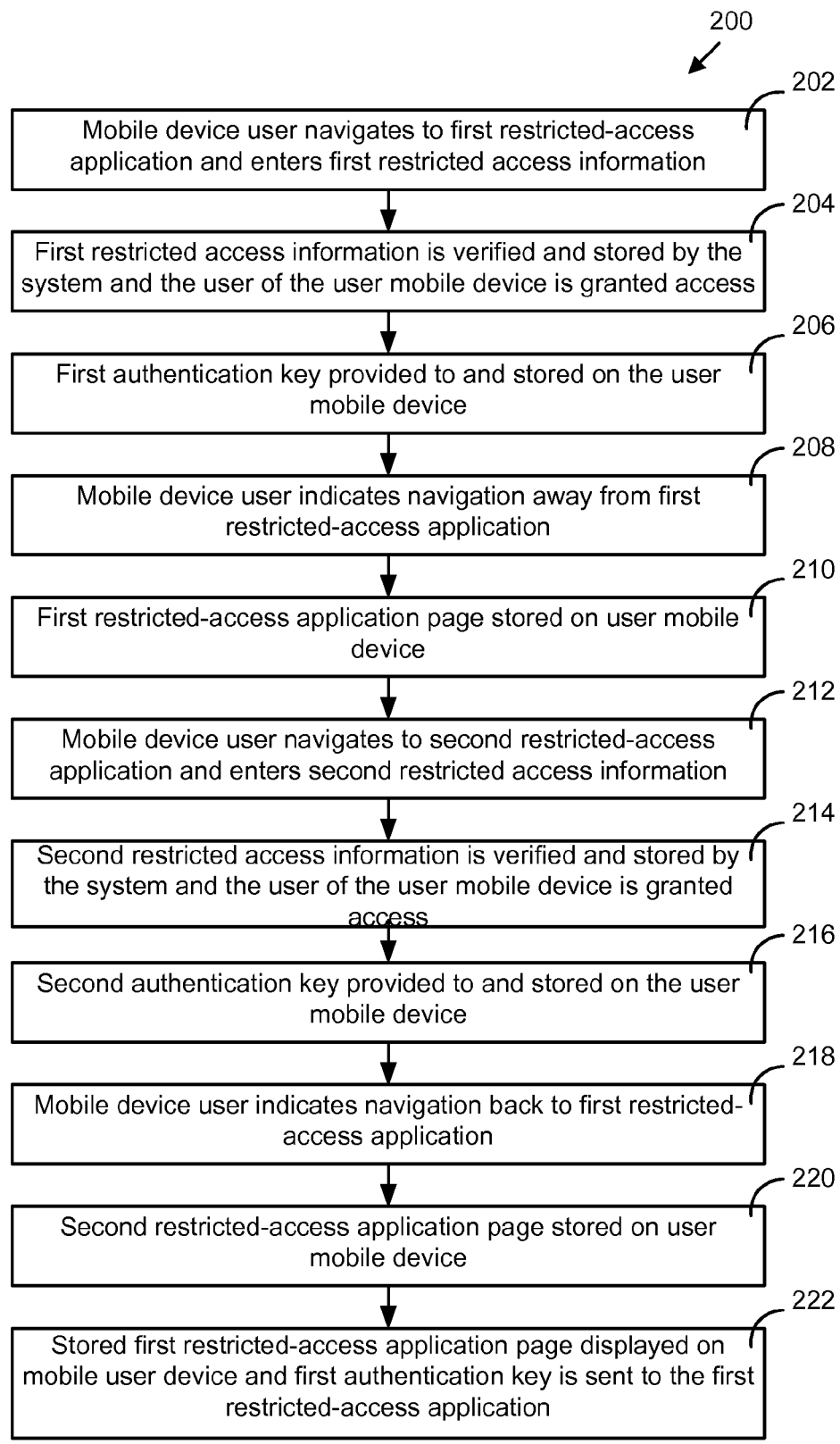
FIG. 2 is a flow diagram of a restricted-access network application switching process for a mobile user device.

FIG. 2 is a flow diagram illustrating a restricted-access network application switching process 200 for switching a user system 12 operating a mobile operating system between restricted-access websites, such as restricted-access applications hosted on cloud-based system 16. With regard to restricted-access network application switching process 200, the user system 12 operating a mobile operating system may be referred to herein as a "user mobile device 12." Process 200 would allow a user of user mobile device 12 to switch back and forth between restricted-access applications hosted on system 16 in a quick and convenient manner.

In process block 202, a user of a user mobile device navigates to a first restricted-access application of a cloud-based system and enters first restricted access information via the user mobile device to access the first restricted-access application. Navigating to the first restricted-access application may include, for example, entering or selecting in a browser a network address (e.g., URL) corresponding to the first restricted-access application. The first restricted-access information may include a username and a password, or any other computer system user authentication information such as other types of identity-confirming information, biometric information, etc. The first restricted-access application could be any application to which access is restricted to particular users such as an email or other communication application, a customer management relationship application, a business calendaring application, a data storage application, etc.

In process block 204, the first restricted access information is verified and stored by the system and the user of the user mobile device is granted access to the first restricted-access application. Access to the first restricted-access application may include an initial page or view of the first restricted-access application with information or data from the application and any subsequent restricted-access pages, views or information that are provided by the application.

In process block 206, the system provides to the user mobile device a first authentication key that is stored in the user mobile device in association with the first restricted-access application. The authentication key functions as a credential for the user's first restricted access information. As one example, the authentication key may be generated in accordance with a protocol, such as the OAuth 1.0 protocol or the OAuth 2.0 protocol, both of which are open protocols described by the Internet Engineering Task Force to allow secure authorization.

In process block 208, the user of the user mobile device indicates navigation away from the first restricted-access application. For example, the user may enter or make a mobile operating system user interface input or gesture indicating that a new network location is to be accessed. For example, the user may access or select a browser address bar indicating an intention to enter and navigate to new network address or application. In another implementation, mobile operating system user interface may include a user gesture, such as swiping the user mobile device touchscreen to one side (e.g., the left) to open a new session with a new website or application.

In process block 210, the page, view or information provided by the first restricted-access application and displayed on the mobile user device is stored on the mobile device when the user indicates navigation away from the first restricted-access application. For example, the mobile user device may cache the page, view or information (e.g., a "screenshot"). The stored page, view or information may be referred to as a stored first restricted-access application page.

In process block 212 the user navigates to a second restricted-access application of the cloud-based system, the second restricted-access application having an association with the first restricted-access application, and enters second restricted access information via the user mobile device to access the second restricted-access application. Navigating to the second restricted-access application may include, for example, entering or selecting in the browser a network address (e.g., URL) corresponding to the second restricted-access application. For example, the first and second restricted-access applications may be provided by a common provider or may otherwise allow users to have the switching accessibility provided by this method 200.

In process block 214, the second restricted access information is verified and stored by the system and the user of the user mobile device is granted access to the second restricted-access application. Access to the second restricted-access application may include an initial page or view of the second restricted-access application with information or data from the application and any subsequent restricted-access pages, views or information that are provided by the application.

In process block 216, the system provides to the user mobile device a second authentication key that is stored in the user mobile device in association with the second restricted-access application. The authentication key functions as a credential for the user's first restricted access information. As one example, the authentication key may be generated in accordance with a protocol, such as the OAuth 1.0 protocol or the OAuth 2.0 protocol, both of which are open protocols described by the Internet Engineering Task Force to allow secure authorization.

In process block 218, the user of the user mobile device indicates navigation from the second restricted-access application back to the first restricted-access application. For example, the user may enter or make a mobile operating system user interface input or gesture indicating a return back to the first restricted-access application. For example, mobile operating system user interface may include a user gesture, such as swiping the user mobile device touchscreen to one side (e.g., the right) to return to a session with a prior website or application.

In process block 220, the page, view or information provided by the second restricted-access application and displayed on the mobile user device is stored when the user indicates navigation back to the first restricted-access application. For example, the mobile user device may cache the page, view or information (e.g., a "screenshot"). The stored page, view or information may be referred to as a stored second restricted-access application page.

In process block 222 the stored first restricted-access application page is displayed on the mobile user device and the first authentication key is sent to the first restricted-access application to re-establish access to it.

Restricted-access network application switching process 200 includes generally conventional initial accessing of first and second restricted-access applications, but then improved quick and convenient subsequent switching between them. Such a subsequent switch from the second restricted-access application back to the first is illustrated in process blocks 218-222. It will be appreciated, however, that with the second authentication key of process block 216 and the stored second restricted-access application page of process block 220 that the user of the user mobile device could subsequently switch quickly and conveniently back to the second restricted-access application from the first in substantially the same manner.

Moreover, although it is described with reference to two different associated restricted-access applications, restricted-access network application switching process 200 may be applied to any number of associated restricted-access applications. For example, the operations of process 200 relating to each of the first and second restricted-access applications would be applied to each additional restricted-access application.

Restricted-access network application switching process 200 may be implemented in accordance with instructions that are stored on or in tangible, non-transitory computer-readable media and that are executable by or used to program one or more computing systems or devices. Moreover, restricted-access network application switching process 200 and corresponding instructions provide improved efficiency in accessing different restricted-access applications or websites of a cloud-based system from a user mobile device. As a result, process 200 relates to improving the technological operation of restricted-access applications on mobile user devices.

A person having ordinary skill in the art will appreciate that there are many potential applications for one or more implementations of this disclosure and hence, the implementations disclosed herein are not intended to limit this disclosure in any fashion.

The invention claimed is:

1. An apparatus for switching a mobile user device between restricted-access applications that are accessed over a computer network, the apparatus comprising:
   a processor; and
   one or more stored sequences of instructions which, when executed by the processor, cause the processor to carry out the steps of:
   switching a mobile user device between restricted-access applications that are accessed over a computer network, the method comprising:
   providing first information, via a mobile user device, to enable access to a first restricted-access application;
   storing in memory on the mobile user device a first authentication key authenticating access to the first restricted-access application;
   storing a first restricted-access application page of the first restricted-access application in the memory in response to a first user indication, via the mobile user device, to navigate away from the first restricted-access application;
   providing second information, via the mobile user device, to enable access to a second restricted-access application;
   displaying from the memory the first restricted-access application page on the mobile user device in response to a user indication of navigation back to the first restricted-access application; and
   providing the first authentication key from the memory to enable access to the first restricted-access application.

2. The apparatus of claim 1 further comprising one or more stored sequences of instructions which, when executed by the processor, cause the processor to carry out the steps of:
   storing in the memory a second authentication key authenticating access to the second restricted-access application in response to accessing the second restricted-access application; and
   storing in the memory a second restricted-access application page of the second restricted-access application in response to a second user indication, via the mobile user device, to navigate away from the second restricted-access application.

3. The apparatus of claim 2 further comprising one or more stored sequences of instructions which, when executed by the processor, cause the processor to carry out the steps of:
   displaying from the memory the second restricted-access application page on the mobile user device in response to a user indication of navigation back to the second restricted-access application; and
   providing the second authentication key from the memory to enable access to the second restricted-access application.

4. The apparatus of claim 1 in which the first and second restricted-access applications are included in a cloud-based system.

5. The apparatus of claim 1 in which the user mobile device includes a touchscreen and the apparatus further includes one or more stored sequences of instructions which, when executed by the processor, cause the processor to carry out the step of:
   receiving the user indication to navigate away from a restricted-access application as a user gesture on the touchscreen.

6. The apparatus of claim 5 in which the user gesture is a swipe toward one side of the touchscreen.

7. A non-transitory machine-readable medium carrying one or more sequences of instructions for switching mobile operating system users between restricted access websites, which instructions, when executed by one or more processors, cause the one or more processors to carry out the steps of:

- providing first information, via a mobile user device, to enable access to a first restricted-access application;
- storing in memory on the mobile user device a first authentication key authenticating access to the first restricted-access application;
- storing in the memory a first restricted-access application page of the first restricted-access application in response to a first user indication, via the mobile user device, to navigate away from the first restricted-access application;
- providing second information, via the mobile user device, to enable access to a second restricted-access application;
- displaying from the memory the first restricted-access application page on the mobile user device in response to a user indication of navigation back to the first restricted-access application; and
- providing the first authentication key from the memory to enable access to the first restricted-access application.

8. The non-transitory machine-readable medium of claim 7 further carrying one or more sequences of instructions which, when executed by one or more processors, cause the one or more processors to carry out the steps of:

- storing in the memory a second authentication key authenticating access to the second restricted-access application in response to accessing the second restricted-access application; and
- storing in the memory a second restricted-access application page of the second restricted-access application in response to a second user indication, via the mobile user device, to navigate away from the second restricted-access application.

9. The non-transitory machine-readable medium of claim 8 further carrying one or more sequences of instructions which, when executed by one or more processors, cause the one or more processors to carry out the steps of:

- displaying from the memory the second restricted-access application page on the mobile user device in response to a user indication of navigation back to the second restricted-access application; and
- providing the second authentication key from the memory to enable access to the second restricted-access application.

10. The non-transitory machine-readable medium of claim 7 in which the user mobile device includes a touchscreen and the medium further carries one or more sequences of instructions which, when executed by one or more processors, cause the one or more processors to carry out the step of:

- receiving the user indication to navigate away from a restricted-access application as a user gesture on the touchscreen.

11. The non-transitory machine-readable medium of claim 10 in which the user gesture is a swipe toward one side of the touchscreen.

12. A method for switching a mobile user device between restricted-access applications that are accessed over a computer network, the method comprising:

- providing first information, via a mobile user device, to enable access to a first restricted-access application;
- storing in memory on the mobile user device a first authentication key authenticating access to the first restricted-access application;
- storing in the memory a first restricted-access application page of the first restricted-access application in response to a first user indication, via the mobile user device, to navigate away from the first restricted-access application;
- providing second information, via the mobile user device, to enable access to a second restricted-access application;
- displaying from the memory the first restricted-access application page on the mobile user device in response to a user indication of navigation back to the first restricted-access application; and
- providing the first authentication key from the memory to enable access to the first restricted-access application.

13. The method of claim 12 further including:

- storing in the memory a second authentication key authenticating access to the second restricted-access application in response to accessing the second restricted-access application; and
- storing in the memory a second restricted-access application page of the second restricted-access application in response to a second user indication, via the mobile user device, to navigate away from the second restricted-access application.

14. The method of claim 13 further including:

- displaying from the memory the second restricted-access application page on the mobile user device in response to a user indication of navigation back to the second restricted-access application; and
- providing the second authentication key from the memory to enable access to the second restricted-access application.

15. The method of claim 12 in which the first and second restricted-access applications are included in a cloud-based system.

16. The method of claim 12 in which the user mobile device includes a touchscreen and the user indication, via the mobile user device, to navigate away from a restricted-access application includes a user gesture on the touchscreen.

17. The method of claim 16 in which the user gesture is a swipe toward one side of the touchscreen.

\* \* \* \* \*